(12) United States Patent  
Park (10) Patent No.: US 9,236,586 B2
(45) Date of Patent: Jan. 12, 2016

(54) BATTERY PACK

(75) Inventor: Sang-Hun Park, Yongin-si (KR)

(73) Assignee: Samsung SDI Co., Ltd, Yongin-si (KR)

( * ) Notice: Subject to any disclaimer, the term of this patent is extended or adjusted under 35 U.S.C. 154(b) by 391 days.

(21) Appl. No.: 13/563,569

(22) Filed: Jul. 31, 2012

(65) Prior Publication Data

US 2013/0273410 A1   Oct. 17, 2013

Related U.S. Application Data

(60) Provisional application No. 61/624,179, filed on Apr. 13, 2012.

(51) Int. Cl.
| | |
|---|---|
| *H01M 2/08* | (2006.01) |
| *H01M 2/02* | (2006.01) |
| *H01M 2/06* | (2006.01) |
| *H01M 2/30* | (2006.01) |
| *H01M 2/34* | (2006.01) |
| *H01M 10/42* | (2006.01) |

(52) U.S. Cl.
CPC .............. *H01M 2/08* (2013.01); *H01M 2/0212* (2013.01); *H01M 2/06* (2013.01); *H01M 2/30* (2013.01); *H01M 2/348* (2013.01); *H01M 10/425* (2013.01); *H01M 2220/30* (2013.01)

(58) Field of Classification Search
None
See application file for complete search history.

(56) References Cited

U.S. PATENT DOCUMENTS

| | | | | |
|---|---|---|---|---|
| 4,389,471 | A  * | 6/1983 | Woodhouse | 429/178 |
| 2006/0105237 | A1* | 5/2006 | Oh | 429/180 |
| 2006/0127756 | A1* | 6/2006 | Seo | 429/175 |
| 2007/0264563 | A1* | 11/2007 | Yoon et al. | 429/149 |
| 2009/0191450 | A1* | 7/2009 | Kim | 429/97 |

FOREIGN PATENT DOCUMENTS

| | | |
|---|---|---|
| KR | 10-2004-0107868 | 12/2004 |
| KR | 10-2008-0104232 | 12/2008 |
| KR | 10-2011-0118195 | 10/2011 |

OTHER PUBLICATIONS

You et al. KR 10-2008-0104232, Machine translation.*

* cited by examiner

*Primary Examiner* — Carlos Barcena
*Assistant Examiner* — Wojciech Haske
(74) *Attorney, Agent, or Firm* — Christie, Parker & Hale, LLP (57) ABSTRACT

A battery pack including a bare cell including an electrode assembly, and a battery case including a body portion accommodating the electrode assembly, and a sealing portion extending from the body portion; and a bonding member bonding the sealing portion to the body portion, the bonding member having a slit formed therein.

16 Claims, 10 Drawing Sheets

BATTERY PACK

CROSS-REFERENCE TO RELATED APPLICATION

This application claims priority to and the benefit of U.S. Provisional Application No. 61/624,179, filed on Apr. 13, 2012 in the United States Patent and Trademark Office, the entire content of which is incorporated herein by reference.

BACKGROUND

1. Field

Aspects of embodiments of the present invention relate to a battery pack.

2. Description of the Related Art

Recently, battery packs have been variously used as power sources of portable electronic devices. As the portable electronic devices are used in various fields, demands on battery packs are rapidly increasing. The battery packs can be charged/discharged a plurality of times, and, accordingly, are economically and environmentally efficient. Thus, the use of the battery packs is encouraged.

As small size and light weight of electronic devices are desired, small size and light weight of battery packs are also desired. However, since a material such as lithium having high reactivity is provided to the inside of the battery pack, the small size and light weight of the battery pack is limited due to the safety of the battery pack. Accordingly, a variety of studies have been conducted to develop a battery pack that can implement a small size and light weight while improving the safety thereof.

SUMMARY

According to an aspect of embodiments of the present invention, a battery pack has a small size and light weight as a result of a bonding member.

According to another aspect of embodiments of the present invention, a battery pack has improved safety.

According to an embodiment of the present invention, a battery pack includes: a bare cell including an electrode assembly, and a battery case including a body portion accommodating the electrode assembly, and a sealing portion extending from the body portion; and a bonding member bonding the sealing portion to the body portion, the bonding member having a slit formed therein.

The battery pack may further include a temperature member electrically connected to the bare cell, the temperature member being arranged on the sealing portion and including a lead portion on the bonding member.

In one embodiment, the sealing portion includes: a first sealing portion extending from a first side surface of the body portion; and a second sealing portion extending from a second side surface of the body portion adjacent the first side surface, and the second sealing portion is folded with respect to the first sealing portion.

In one embodiment, the slit formed in the bonding member extends in a direction parallel to the first side surface.

The bonding member may include: a first bonding member portion at a first side of the slit and arranged on a first outer surface of the second sealing portion; and a second bonding member portion at a second side of the slit opposite the first side of the slit, the second bonding member portion being folded and arranged on both the first outer surface of the second sealing portion and a second outer surface of the second sealing portion opposite the first outer surface.

The second bonding member portion may include a portion arranged on the first sealing portion.

The first bonding member portion may include a portion arranged on a top surface of the body portion that is adjacent each of the first side surface and the second side surface.

In one embodiment, the slit formed in the bonding member extends in a direction perpendicular to the first side surface.

The bonding member may include: a first bonding member portion at a first side of the slit, the first bonding member portion being folded and arranged on both a first outer surface of the second sealing portion and a second outer surface of the second sealing portion opposite the first outer surface; and a second bonding member portion at a second side of the slit opposite the first side of the slit, the second bonding member portion being folded.

The second bonding member portion may include a portion arranged on the first sealing portion. The second bonding member portion may further include a portion attached to the first side surface of the body portion.

An unfolded portion of the second bonding member portion may be arranged on a top surface of the body portion that is adjacent each of the first side surface and the second side surface.

The bare cell may further include an electrode tab extending from the first sealing portion, the electrode tab being folded with respect to the first sealing portion and being connected on a lead portion of a temperature member of the battery pack.

The bonding member may maintain a surface of the sealing portion opposite a surface of the body portion.

In one embodiment, the bonding member includes a first bonding member portion at a first side of the slit, and a second bonding member portion at a second side of the slit opposite the first side of the slit, and the second bonding member portion is folded in a different direction than the first bonding member portion.

In one embodiment, the bonding member covers a portion of the sealing portion including a metal layer, and the bonding member surrounds a corner portion of the sealing portion including an exposed portion of the metal layer.

The bonding member may include at least one of polyimide, polypropylene, or polyethylene terephthalate.

Corners of the bonding member may have a rounded shape.

In one embodiment, the bonding member is a first bonding member and bonds the sealing portion to the body portion at a first side of the bare cell, and the battery pack further includes a second bonding member bonding the sealing portion to the body portion at a second side of the bare cell opposite the first side.

According to another embodiment of the present invention, a battery pack includes: a bare cell including a main body accommodating an electrode assembly therein and a sealing portion extended from side surfaces of the main body; a bonding member bonding the sealing member to the main body; and a temperature member of which at least one portion is positioned on the bonding member, wherein at least one slit is formed in the bonding member.

The bonding member may include first and second regions partitioned by the slit, and a third region positioned on an extended line of the slit so as to connect the first and second regions.

The first and second regions may be folded in different directions from each other.

The sealing portion may include a first sealing portion extended from a first side surface among the side surfaces of the main body, from which an electrode tab of the bare cell is extracted, and a second sealing portion connected to the first sealing portion and extended from a second side surface adjacent to the first side surface among the side surfaces of the main body. The second sealing member may be bent from the first sealing member so as to be folded in a state in which the second sealing portion faces toward the second side surface.

The first region of the bonding member may bond an outer surface of the second sealing portion and the main body to each other, and the second region of the bonding member may be positioned on the outer surface and an inner surface of the second sealing portion so as to surround a corner of the second sealing portion. The second region of the bonding member may be extended up to a top surface of the first sealing portion.

At least one portion of the temperature member may be positioned on the second region of the bonding member which may be bonded on the top surface of the first sealing member.

The slit may be formed in a direction parallel to the first surface among the side surfaces of the main body, from which the electrode tab is extracted.

The temperature member may include a member portion cutting off abnormal current flowing in the bare cell, and first and second lead portions respectively extended to sides of the member portion. The electrode tab of the bare cell may be connected to the first lead portion.

The temperature member may be a thermal cut off (TCO) member.

The corners of the first, second, and third regions may be formed in a rounded shape.

The first region of the bonding member may be positioned on the outer and inner surfaces of the second sealing portion so as to surround the corner of the second sealing portion, and the second region of the bonding member may be positioned on the main body and the top surfaces of the first sealing portion.

The slit may be formed in a direction perpendicular to the first side surface among the side surfaces of the bare cell, from which the electrode tab is extracted.

According to an aspect of embodiments of the present invention, in a battery pack, a slit is formed in a bonding member for bonding a main body and a sealing portion, such that the battery pack may have a small size and light weight.

According to another aspect of embodiments of the present invention, the safety of the battery pack is improved.

The above and other features and aspects of the present invention are set forth or will become more fully apparent in the description that follows.

BRIEF DESCRIPTION OF THE DRAWINGS

The accompanying drawings, together with the specification, illustrate some exemplary embodiments of the present invention, and, together with the description, serve to explain aspects and principles of the present invention.

DETAILED DESCRIPTION

In the following detailed description, some exemplary embodiments of the present invention are shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or indirectly on the another element with one or more intervening elements interposed therebetween. Also, when an element is referred to as being "connected to" another element, it can be directly connected to the another element or indirectly connected to the another element with one or more intervening elements interposed therebetween. Hereinafter, like reference numerals refer to like elements.

Figure 1:
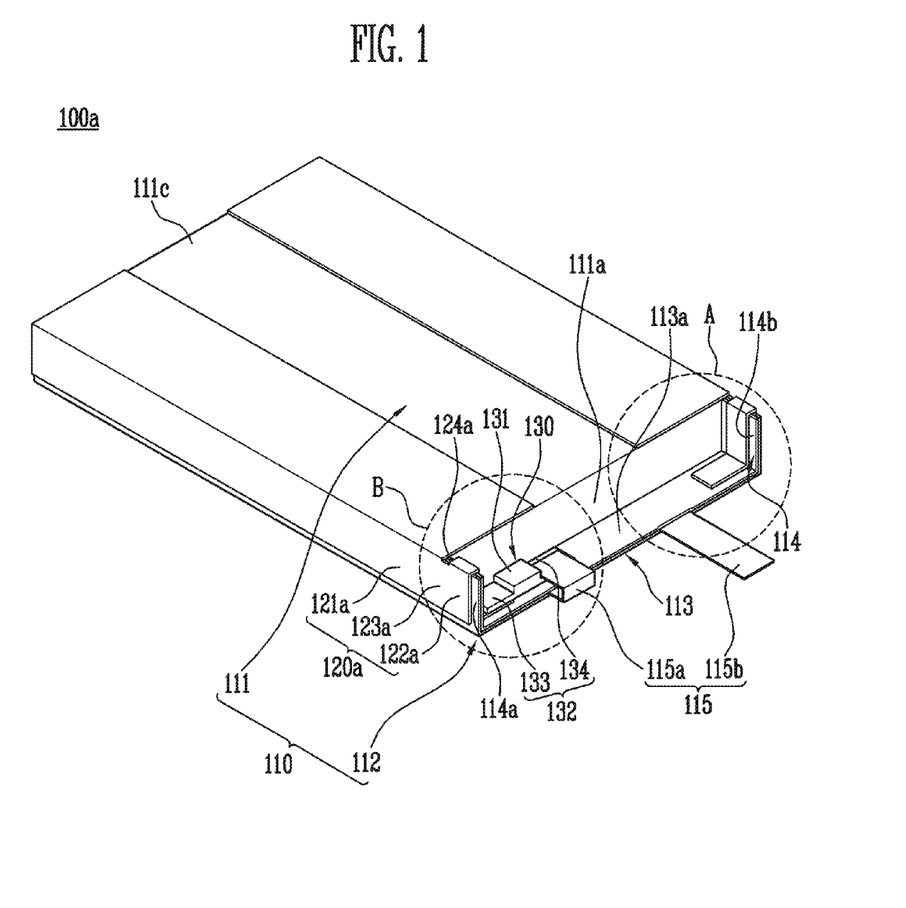
FIG. 1 is a perspective view of a battery pack according to an embodiment of the present invention.
Figure 2:
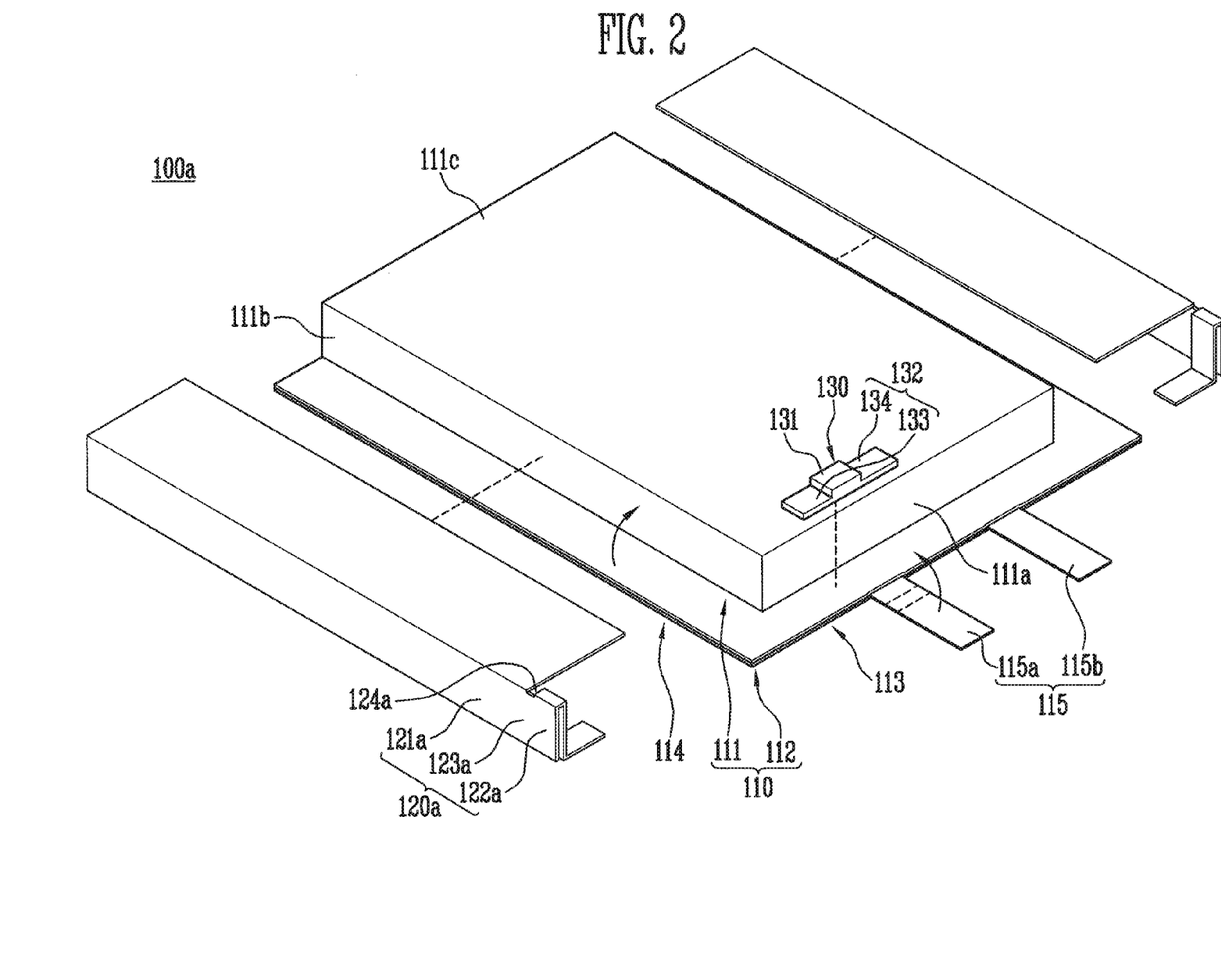
FIG. 2 is an exploded perspective view of the battery pack of FIG. 1.

FIG. 1 is a perspective view of a battery pack 100a according to an embodiment of the present invention. FIG. 2 is an exploded perspective view of the battery pack 100a shown in FIG. 1. The battery pack 100a according to an embodiment of the present invention is described below with reference to FIGS. 1 and 2.

As shown in FIGS. 1 and 2, the battery pack 100a according to an embodiment of the present invention includes a bare cell 110 including a main body 111 and a sealing portion 112, a bonding member 120a bonding the sealing portion 112 to the main body 111, and a temperature member 130 of which at least a portion is positioned on the bonding member 120a. The battery pack 100a according to one embodiment has a structure in which a slit 124a is formed in the bonding member 120a such that a small size and light weight of the battery pack 100a may be implemented while improving the safety of the battery pack 100a.

The bare cell 110 is a member in which electrochemical energy is generated by movements of ions or electrons.

The bare cell 110 may include the main body 111 accommodating an electrode assembly 119 (see FIG. 7) inside the main body 111, and the sealing portion 112 extended from three or more sides of the main body 111. The bare cell 110 may have an electrode tab 115 including first and second electrode tabs 115a and 115b extended from the sealing portion 112. One of the first and second electrode tabs 115a and 115b may have a positive polarity, and the other of the first and second electrode tabs 115a and 115b may have a negative polarity.

As shown in FIG. 2, the sealing portion 112 may include a first sealing portion 113 extended from a first side surface 111a among side surfaces of the main body 111, from which the electrode tab 115 is extracted, and a second sealing portion 114 extended from two second side surfaces 111b adjacent to the first side surface 111a. The first and second sealing portions 113 and 114 may be connected to each other, and the second sealing portion 114 may have a shape folded with respect to the first sealing portion 113 so as to be opposite to the second side surface 111b of the main body 111. Therefore, when the battery pack 100a is viewed from the first side surface 111a of the bare cell 110, the first and second sealing portions 113 and 114 may have, for example, a "]" or "[" shape. That is, the second sealing portion 114 may have a shape in which the second sealing portion 114 is extended up to sides of the first sealing portion 113 so as to block or cover both the sides of the first sealing portion 113. Alternatively, the second sealing portion 114 may have a shape in which the second sealing portion 114 is positioned on a top surface 113a of the first sealing portion 113 in the state in which the second sealing member 114 is folded by folding a portion at which the second and first sealing member 114 and 113 meet each other. The sealing portion 112 may include a third sealing portion extended from a side surface opposite to the first side surface 111a of the bare cell 110.

The internal structure of the bare cell 110 will be described in further detail with reference to FIG. 7.

Figure 3:
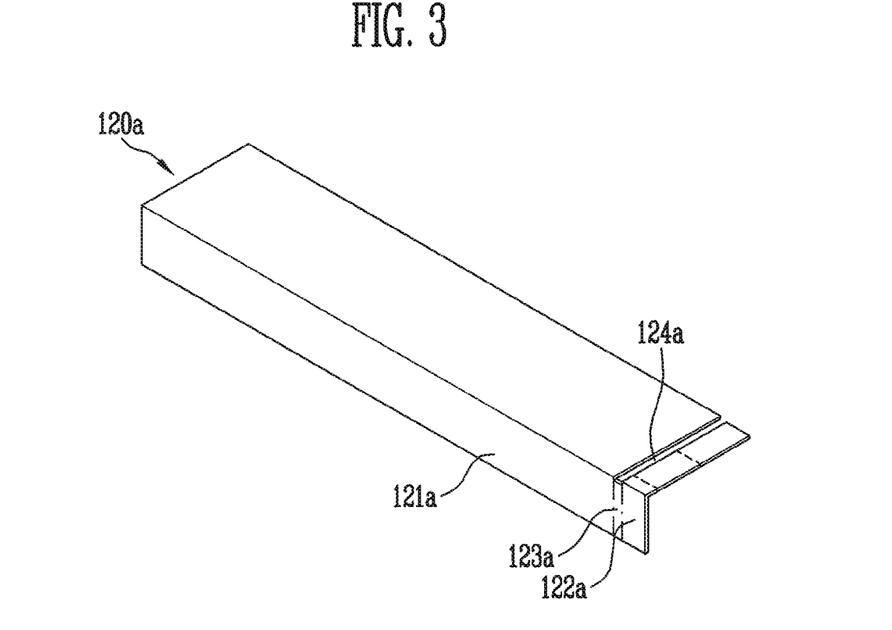
FIG. 3 is a perspective view of a bonding member of a battery pack according to an embodiment of the present invention, the bonding member shown in an unfolded state.
Figure 4:
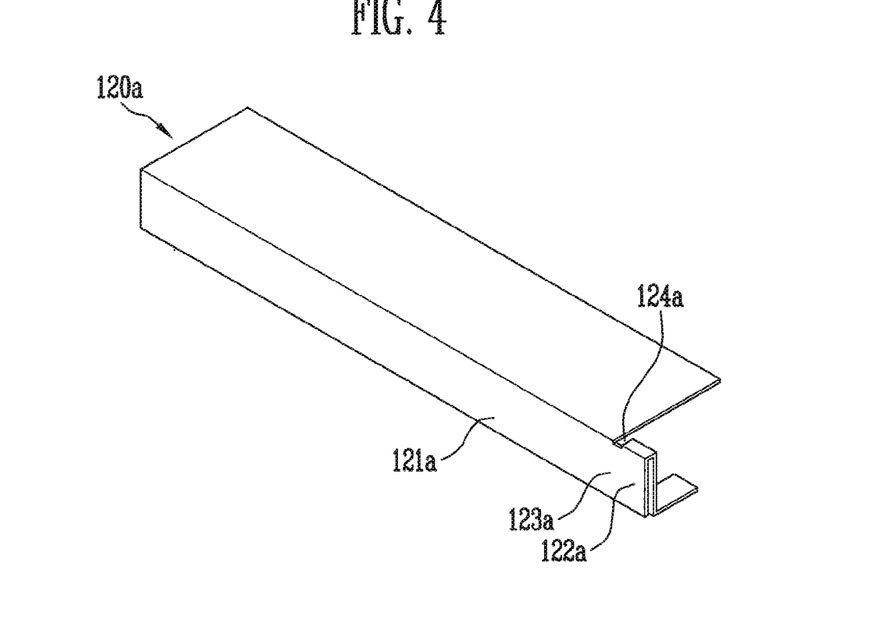
FIG. 4 is a perspective view of the bonding member of FIG. 3, shown in a folded state.
Figure 5:
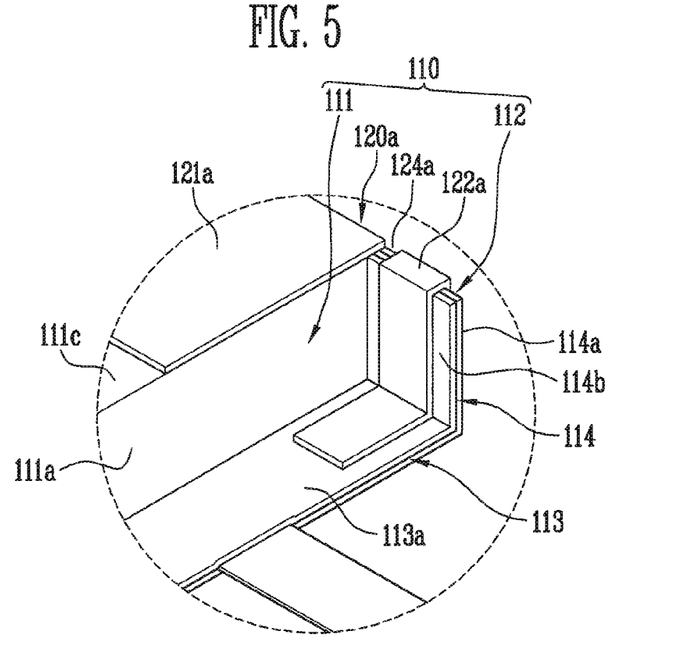
FIG. 5 is an enlarged perspective view of a region "A" of FIG. 1.

FIG. 3 is a perspective view of the bonding member 120a of the battery pack 100a according to an embodiment of the present invention, shown in an unfolded, or initial, state. FIG. 4 is a perspective view of the bonding member 120a, shown in a folded, or final, state. FIG. 5 is an enlarged perspective view of a region "A" of FIG. 1. The bonding member 120a of the battery pack 100a according to an embodiment of the present invention is described below with reference to FIGS. 3 to 5.

The bonding member 120a is a member provided at both sides of the main body 111 so as to bond the sealing portion 112 to the main body 111, and at least one slit 124a is formed in the bonding member 120a, as shown in FIG. 3. The bonding member 120a may be folded in different directions based on the slit 124a. For example, the bonding member 120a, in one embodiment, is folded in the different directions from the initial state shown in FIG. 3 to be folded in the final state shown in FIG. 4. In one embodiment, the bonding member 120a may be implemented, for example, using a polyimide (PI) tape or other suitable material so as to bond the sealing portion 112 to the main body 111. In one embodiment, the slit 124a may be formed in parallel to a short side of sides of the bonding member 120a. More specifically, the slit 124a may be formed in a direction parallel to the first side surface 111a of the bare cell 110.

The bonding member 120a may include, for example, three regions based on the slit 124a. Specifically, the bonding member 120a may include first and second regions 121a and 122a respectively partitioned as left and right sides by the slit 124a, and a third region 123a positioned at an extended line of the slit 124a so as to connect the first and second regions 121a and 122a. In one embodiment, the first region 121a is positioned to cover an outer surface 114a of the second sealing portion 114 and the main body 111, such that the second sealing member 114 may be bonded to the main body 111. The first region 121a may have a shape in which the first region 121a is folded once based on a corner of the second side surface 111b or an end of the second sealing portion 114.

Since the first region 121a bonds the second sealing portion 114 to the main body 111, the first region 121a enables the second sealing portion 114 to be bonded to the main body 111 while maintaining a shape in which the second sealing portion 114 is opposite to the main body 111. The second region 122a may surround the outer surface 114a and an inner surface 114b of the second sealing portion 114 so as to surround an upper corner of the second sealing portion 114. The second region 122a may be further extended so as to be positioned on the top surface 113a of the first sealing portion 113. Therefore, the second region 122a may have a shape in which the second region 122a is folded two or more times. The third region 123a may be positioned on the outer surface 114a of the second sealing portion 114 so as to connect the first and second regions 121a and 122a to each other on the outer surface 114a of the second sealing portion 114 (see FIG. 6). The bonding member 120a may be positioned at one side or both sides of the bare cell 110.

In a conventional bonding member, a slit is not formed in the bonding member, and it is difficult to bond the conventional bonding member at a position at which the first and second sealing members meet each other. Although the conventional bonding member may be bonded, the conventional bonding member is protruded or lumped due to the occurrence of an overlapped portion of the bonding member, and therefore, the external appearance of the conventional bonding member is not neat. However, in the bonding member 120a according to an embodiment of the present invention, the slit 124a is formed in the bonding member 120a, and the first and second regions 121a and 122a partitioned by the slit 124a are folded in different directions from each other such that the first and second regions 121a and 122a can be smoothly adhered to the sealing portion 112 without being overlapped with each other. Thus, the external appearance of the battery pack 100a is neat. Accordingly, the battery pack 100a is implemented having a small size and light weight.

Figure 6:
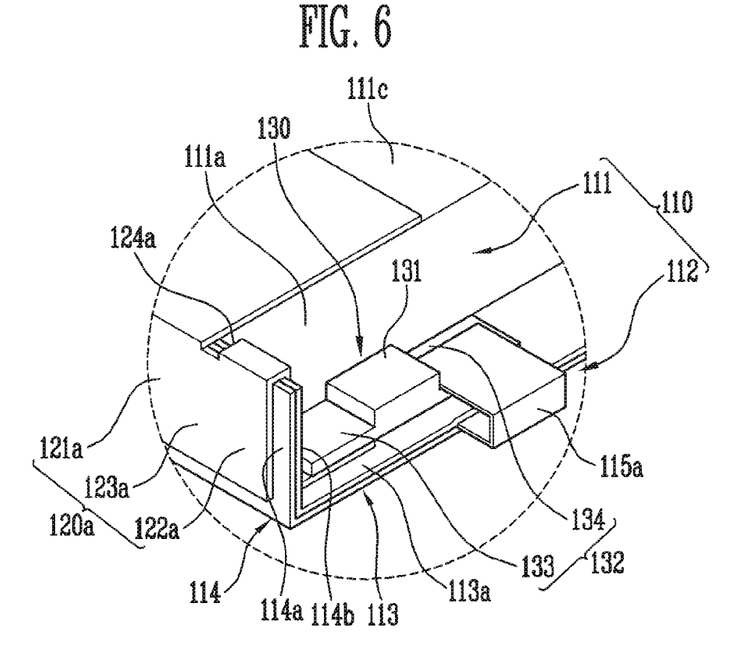
FIG. 6 is an enlarged perspective view of a region "B" of FIG. 1.

FIG. 6 is an enlarged perspective view of a region "B" of FIG. 1. The temperature member 130 of the battery pack 100a according to an embodiment of the present invention is described below with reference to FIG. 6.

The temperature member 130 is a member connected between the bare cell 110 and a protection circuit module so as to cut off an abnormal current flowing in the bare cell 110. In one embodiment, the temperature member 130 may be implemented, for example, using a thermal cut off (TCO) member. If a resistance is increased due to the abnormal current flowing in the bare cell 110, heat generated by the increase of resistance is transferred to a bimetal so as to cut off a current path. The temperature member 130, in one embodiment, includes a member portion 131 performing the above-described function, and a lead portion 132 extended from both ends of the member portion 131 so as to connect the member portion 131 and the bare cell 110 or the protection module.

The temperature member 130, in one embodiment, is positioned on the first sealing member 113. More specifically, a portion of the temperature member 130 may be positioned on the second region 122a of the bonding member 120a positioned on the top surface 113a of the first sealing member 113. In one embodiment, a first lead portion 133 of the lead portion 132 of the temperature member 130 may be positioned on the second region 122a of the bonding member 120a, and a second lead portion 134 of the lead portion 132 of the temperature member 130 may be connected to the first electrode tab 115a of the electrode tab 115 of the bare cell 110 while being positioned on the top surface 113a of the first sealing portion 113. The first electrode tab 115a may have a shape in which the first electrode tab 115a is bent twice so as to be connected to the second lead portion 134. An electrode separately extended from the first lead portion 133 may be provided to the first lead portion 133 of the temperature member 130 positioned on the second region 122a of the bonding member 120a. The electrode may be connected to the protection circuit module so as to form a closed circuit, and thus current can be sequentially applied to the second lead portion 134, the member portion 131, and the first lead portion 133.

In one embodiment, the bonding member 120a is formed of an insulating material such as a PI tape, and the bonding member 120a can further insulate the temperature member 130 and the first sealing portion 113 from each other. In one embodiment, the bonding member 120a is formed of at least one of polyimide, polypropylene, or polyethylene terephthalate. Thus, it is possible to further reduce the possibility that the temperature member 120 is short circuited with the bare cell 110. In a conventional bonding member, the slit is not formed in the bonding member, and the conventional bonding member is positioned on the first sealing member in the state in which the bonding member is floated or lumped. Therefore, it is difficult to position the temperature member on the conventional bonding member. However, the bonding member 120a of the battery pack 100a according to an embodiment of the present invention has the slit 124a such that the first, second, and third regions 121a, 122a and 123a can be adhered closely to the sealing portion 112 or the main body 111, and the temperature member 130 can be easily positioned on the bonding member 120a. Further, since the temperature member 130 can be positioned on a flat surface of the bonding member 120a, the temperature member 130 can be more stably driven as compared with a temperature member on the conventional bonding member.

Figure 7:
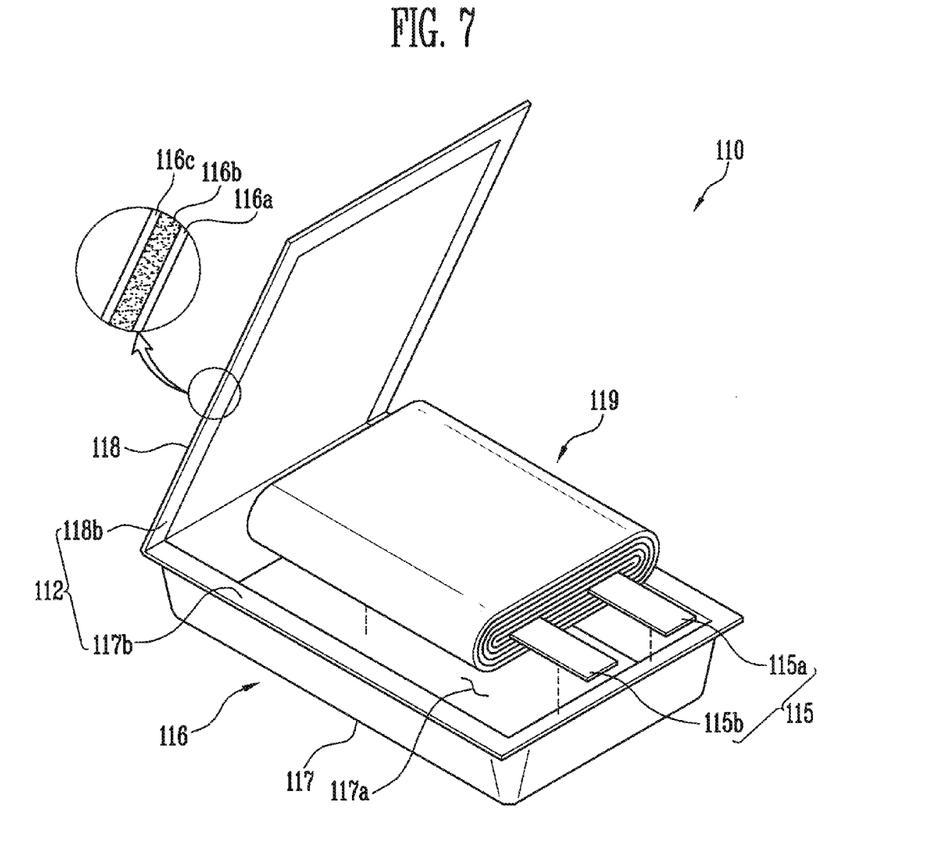
FIG. 7 is an exploded perspective view of a bare cell of the battery pack of FIG. 1, according to an embodiment of the present invention.

FIG. 7 is an exploded perspective view of the bare cell 110 of the battery pack 100a, according to an embodiment of the present invention. A configuration of the bare cell 110 according to an embodiment of the present invention is described below with reference to FIG. 7.

As shown in FIG. 7, the bare cell 110 may include a battery case 116 and an electrode assembly 119 accommodated in the battery case 116.

In one embodiment, the electrode assembly 119 is a member having the electrode tab 115 provided at one side thereof, and the electrode assembly 119 and the battery case 116 constitute the bare cell 110. In the electrode assembly 119, electrochemical energy is generated by movements of ions or electrons. The electrode assembly 119 may include a first electrode plate, a second electrode plate, a separator interposed between the first and second electrode plates, and the electrode tab 115 including the first and second electrode tabs 115a and 115b. The first and second electrode plates may include positive and negative electrode plates, respectively, and the first and second electrode tabs 115a and 115b may have positive and negative polarities, respectively. The electrode tab 115 may be extracted to the outside from one side of the electrode assembly 119 so as to transfer the electrochemical energy generated inside of the bare cell 110 to the outside of the electrode assembly 119. The electrode assembly 119 may be manufactured using various method including a method of winding or stacking the first and second electrode plates and the separator together, or any other suitable method. In the present invention, it will be apparent that the electrode assembly 119 may include all types of electrode assemblies, such as a stacked-type electrode assembly and a wound-type electrode assembly.

The battery case 116 is a member surrounding the electrode assembly 119, and may include a first sub-case 117 and a second sub-case 118. An accommodating portion 117a accommodating the electrode assembly 119 is provided to the first sub-case 117, and the second sub-case 118 may be implemented to cover the first sub-case 117. Therefore, the accommodating portion 117a of the first sub-case 117 may be provided to correspond to the shape and size of the electrode assembly 119. For example, the accommodating portion 117a may be formed by a deep drawing process of making a hollow container with no joint using a flat plate. The bare cell 110 may be manufactured by accommodating the electrode assembly 119 and an electrolyte in the accommodating portion 117a of the first sub-case 117 and forming the sealing portion 112. In one embodiment, the sealing portion 112 is formed by an edge 117b of the first sub-case 117 and an edge 118b of the second sub-case 118 in a state in which the first and second sub-cases 117 and 118 are adhered closely to each other. A portion of the battery case 116, other than the sealing portion, accommodating the electrode assembly 119 may correspond to the main body 111 (see FIG. 1).

In one embodiment, the battery case 116 may include an internal resin layer 116a, a metal layer 116b, and an external resin layer 116c, which are sequentially laminated. The internal resin layer 116a is a portion directly facing the electrode assembly 119, and the external resin layer 116c is a portion corresponding to the outermost surface of the battery case 116. The internal and external resin layers 116a and 116c may be formed of a polymer resin, or the like, which is an electrical non-conductor, so as to prevent or substantially prevent a short circuit therebetween. The metal layer 116b may be interposed between the internal and external resin layers 116a and 116c so as to provide mechanical strength (e.g., a predetermined mechanical strength). The metal layer 116b may include, for example, aluminum, etc.

The metal layer 116b is included in the battery case 116, and, according to an embodiment of the present invention, the metal layer 116b and the temperature member 130 are not necessarily short circuited with each other. In the battery pack 100a according to one embodiment, the slit 124a is formed in the bonding member 120a such that the second region 122a of the bonding member 120 is adhered closely to the top surface 113a of the first sealing portion 113. Thus, it is possible to prevent or substantially prevent the temperature member 130 from being short circuited with the metal layer 116b of the battery case 116 in the bare cell 110.

Figure 8:
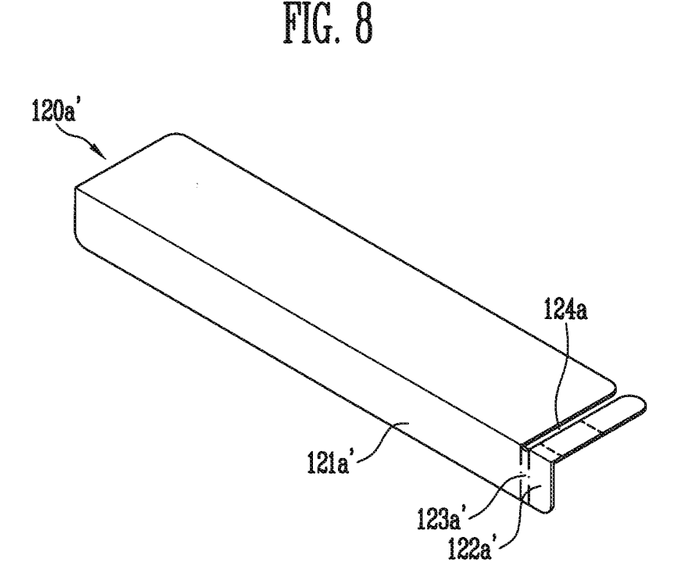
FIG. 8 a perspective view of a bonding member of a battery pack according to another embodiment of the present invention, the bonding member shown in an unfolded state.
Figure 9:
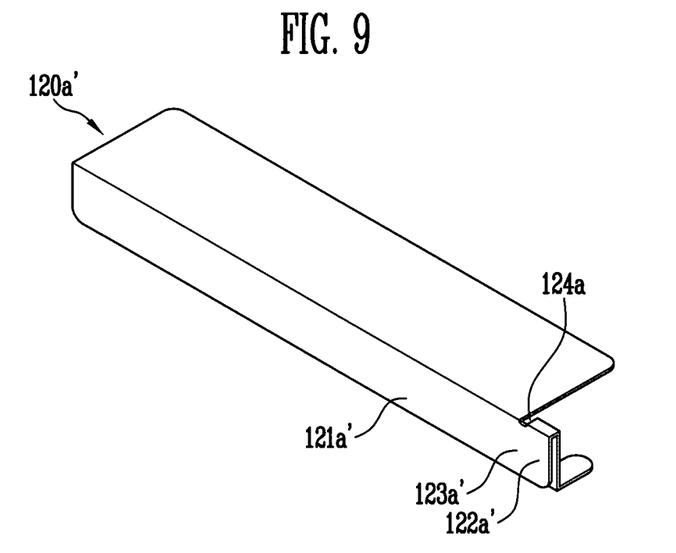
FIG. 9 is a perspective view of the bonding member of FIG. 8, shown in a folded state.

FIG. 8 is a perspective view of a bonding member 120a' of the battery pack 100a according to another embodiment of the present invention, shown in an unfolded, or initial, state. FIG. 9 is a perspective view of the bonding member 120a', shown in a folded, or final, state. The bonding member 120a' according to an embodiment of the present invention is described below with reference to FIGS. 8 and 9.

The bonding member 120a', as illustrated in FIGS. 8 and 9, is different from the bonding member 120a described above with respect to FIGS. 3 and 4 in that corners of the bonding member 120a' are formed in a rounded shape. In one embodiment, as shown in FIGS. 8 and 9, the corners exposed in a first region 121a' of the bonding member 120a', the corners exposed in a second region 122a' of the bonding member 120a', the corner at a point at which the first region 121a' and a third region 123a' meet each other, and the corner at a point at which the second and third regions 122a and 123a' meet each other may be formed in a rounded shape. In one embodiment, the exposed corners of the bonding member 120a' may all be formed in a rounded shape. In one embodiment, the bare cell 110 is configured as a polyhedron having a prismatic shape. Thus, when the bonding member 120a' is applied to the battery pack 100a, the bonding member 120a' having the rounded shape can be more easily mounted to the bare cell 110.

Figure 10:
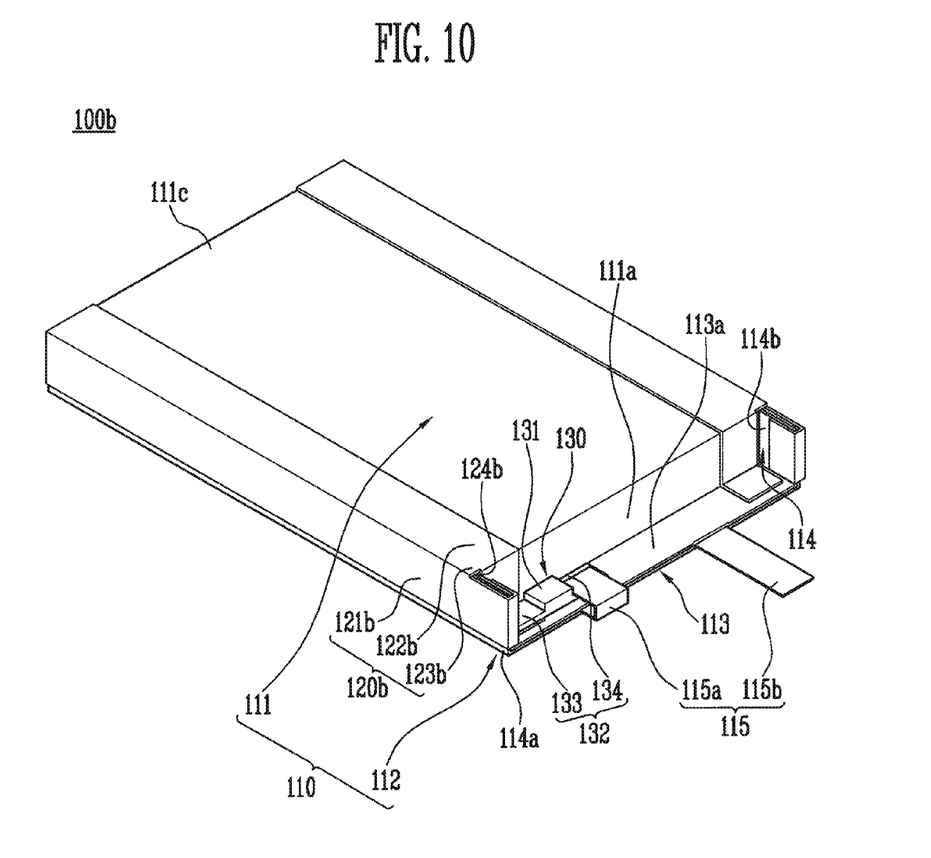
FIG. 10 is a perspective view of a battery pack according to another embodiment of the present invention.
Figure 11:
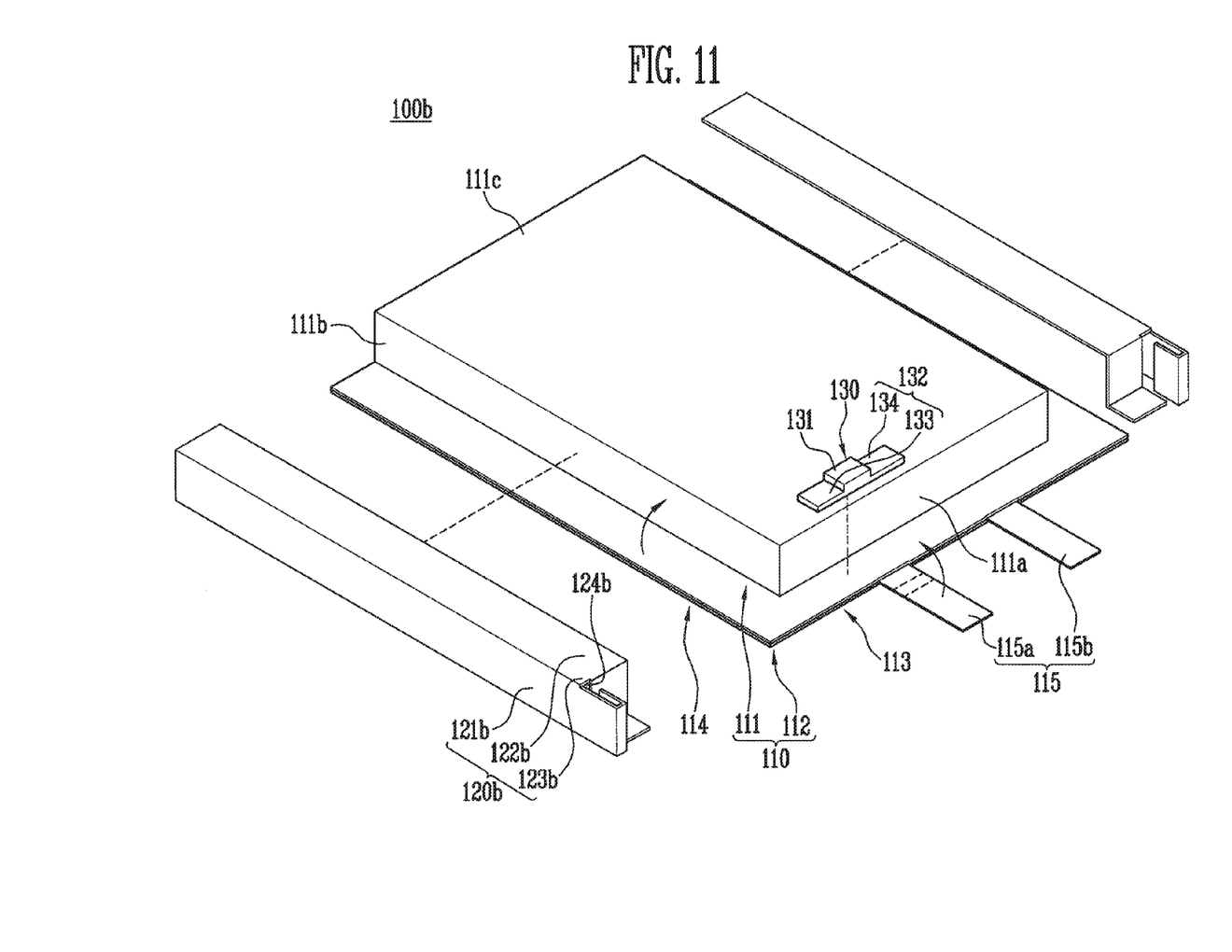
FIG. 11 is an exploded perspective view of the battery pack of FIG. 10.
Figure 12:
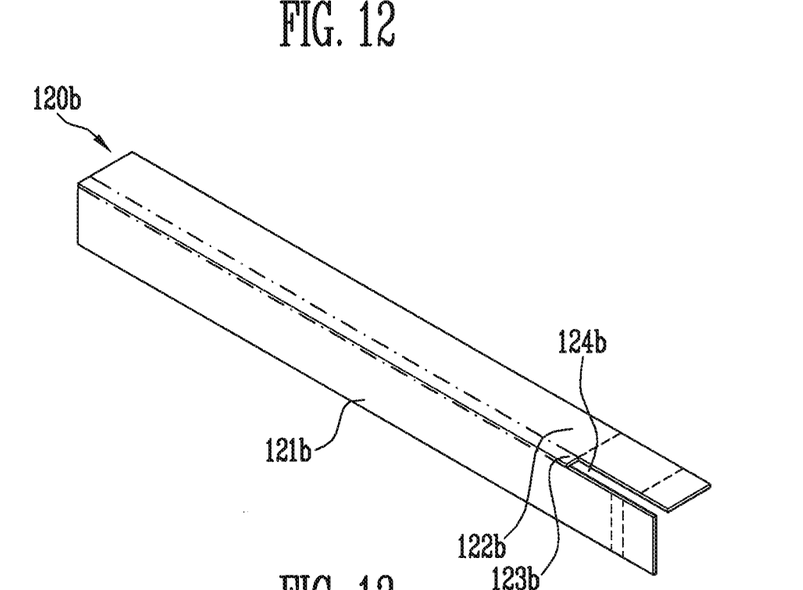
FIG. 12 is a perspective view of a bonding member of a battery pack according to another embodiment of the present invention, the bonding member shown in an unfolded state.
Figure 13:
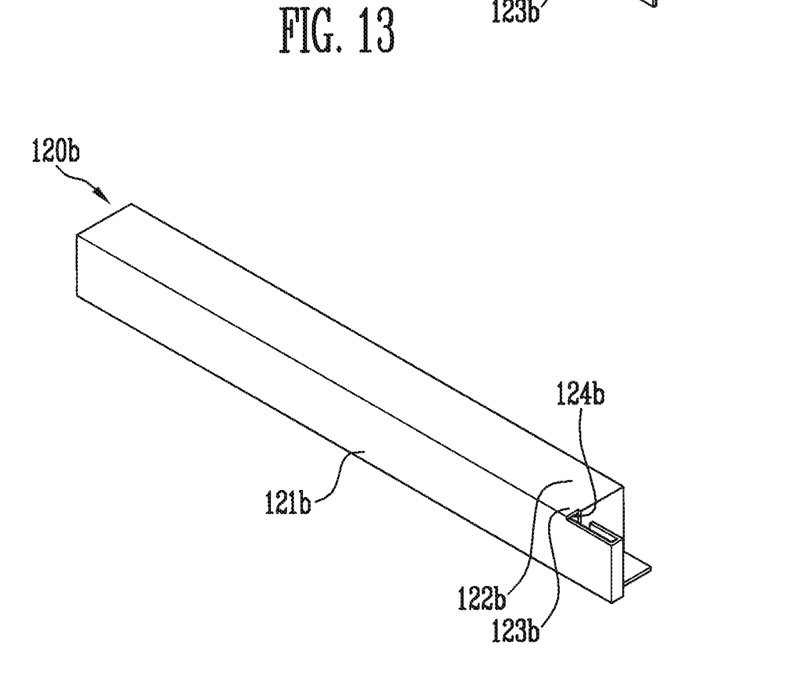
FIG. 13 is a perspective view of the bonding member of FIG. 12, shown in a folded state.

FIG. 10 is a perspective view of a battery pack 100b according to another embodiment of the present invention. FIG. 11 is an exploded perspective view of the battery pack 100b shown in FIG. 10. FIG. 12 is a perspective view of a bonding member 120b of the battery pack 100b according to an embodiment of the present invention, shown in an unfolded, or initial, state. FIG. 13 is a perspective view of the bonding member 120b, shown in a folded, or final, state. The battery pack 100b according to an embodiment of the present invention is described below with reference to FIGS. 10 to 13. In the battery pack 100b, components or features that are the same as corresponding components or features of the battery pack 100a described above are designated by like reference numerals, and further description of the same components and features will not be repeated.

As shown in FIGS. 10 and 11, the battery pack 100b according to one embodiment includes a bare cell 110, a bonding member 120b, and a temperature member 130. In one embodiment, a direction of a slit 124b formed in the bonding member 120b is different from that in the bonding member 120a described above.

In one embodiment, as shown in FIG. 12, the bonding member 120b includes first and second regions 121b and 122b partitioned by the slit 124b, and a third region 123b connecting the first and second regions 121b and 122b. The direction of the slit 124b is not parallel to the first side surface 111a of the main body 111 but, rather, may be perpendicular to the first side surface 111a of the main body 111. That is, the slit 124b may be parallel to a long side of the bonding member 120b. In this case, the first and second regions 121b and 122b partitioned by the slit 124b may be folded in different directions from each other. In one embodiment, the first and second regions 121b and 122b may maintain a folded shape from the state shown in FIG. 12 to the state shown in FIG. 13.

Specifically, the first region 121b of the bonding member 120b may be positioned on the outer surface 114a of the second sealing portion 114 as shown in FIG. 10 or may be positioned on the outer and inner surfaces 114a and 114b of the second sealing portion 114 so as to surround the front side corner of the second sealing portion 114. The second region 122b of the bonding member 120b may be positioned on the top surface 111c of the main body 111, the first side surface 111a of the main body 111, and the top surface 113a of the first sealing portion 113. The third region 123b of the bonding member 120b connects the first and second regions 121b and 122b to each other. Thus, the third region 123b connects the second sealing portion 114 to which the first region 121b is bonded and the main body 111 to which the second region 122b is bonded such that the second sealing member 114 is maintained in a state in which the second sealing member 114 is opposite to the main body 111.

At least a portion of the temperature member 130 may be positioned on the second region 122b of the bonding member 120b, which is extended to the top surface 113a of the first sealing portion 113. Thus, the at least a portion of the temperature member 130 (e.g., the first lead portion 133) is positioned on the second region 122b of the bonding member 120b, such that it is possible to prevent or substantially prevent the temperature member 130 from being unintentionally short circuited with the bare cell 110. In one embodiment, a metal layer may be included in the sealing portion 112 as described above, and the first region 121b of the bonding member 120b according to one embodiment is positioned on the outer and inner surfaces 114a and 114b of the second sealing portion 114 so as to surround the front side corner of the second sealing member 114, and hence the metal layer exposed to the front side corner of the second sealing portion 114 is insulated from the outside. Thus, it is possible to prevent or substantially prevent the bare cell 110 from being short circuited with an external device.

Figure 14:
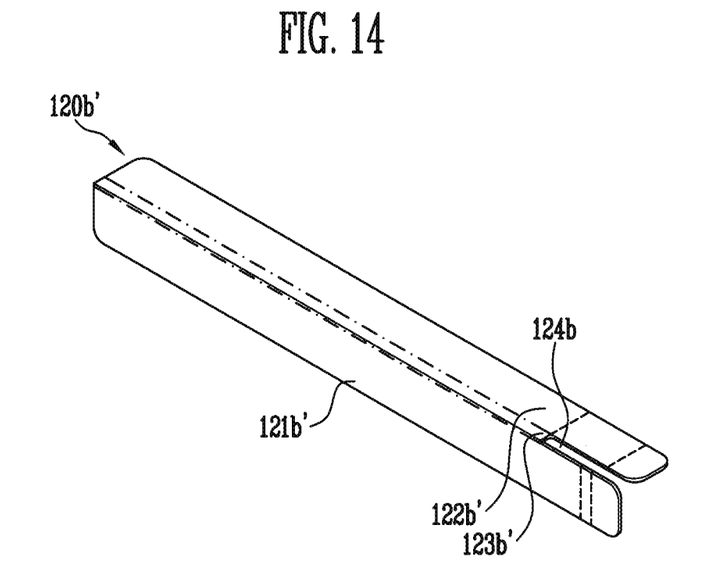
FIG. 14 is a perspective view of a bonding member of a battery pack according to another embodiment of the present invention, the bonding member shown in an unfolded state.
Figure 15:
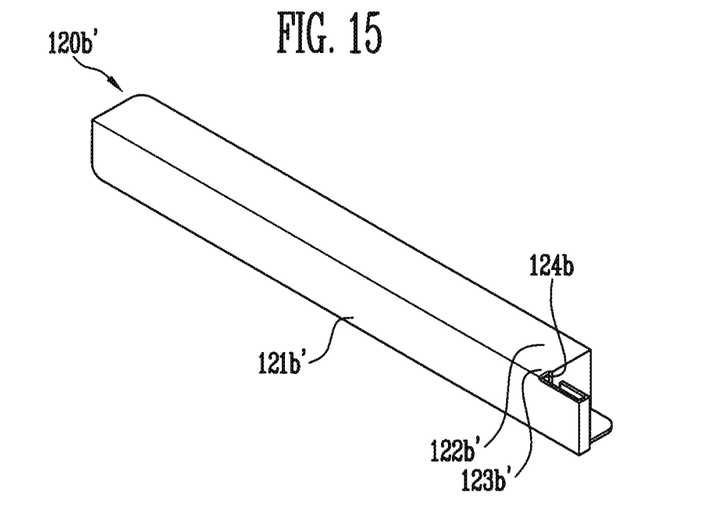
FIG. 15 is a perspective view of the bonding member of FIG. 14, shown in a folded state.

FIG. 14 is a perspective view of a bonding member 120b' of the battery pack 100b according to another embodiment of the present invention, shown in an unfolded, or initial, state. FIG. 15 is a perspective view of the bonding member 12013', shown in a folded, or final, state. The bonding member 120b' of the battery pack 100b according to one embodiment is described below with reference to FIGS. 14 and 15.

As shown in FIGS. 14 and 15, the bonding member 120b' of the battery pack 100b according to one embodiment is different from the bonding member 120b described above with respect to FIGS. 12 and 13 in that exposed corners of the bonding member 120b' are formed in a rounded shape. In one embodiment, as shown in FIGS. 14 and 15, the corners exposed in a first region 121b' of the bonding member 120b', the corners exposed in a second region 122b' of the bonding member 120b', the corner at a point at which the first region 121b' and a third region 123b' meet each other, and the corner at a point at which the second and third regions 122b' and 123b' meet each other may be formed in a rounded shape. In one embodiment, the exposed corners of the bonding member 120b' may all be formed in a rounded shape. Thus, when the bonding member 120b' is applied to the battery pack 100b, the bonding member 120b' having the rounded shape can be more easily mounted to the bare cell.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery pack comprising:
  a bare cell comprising:
    an electrode assembly; and
    a battery case comprising a body portion accommodating the electrode assembly, and a sealing portion extending from the body portion;
  a bonding member bonding the sealing portion to the body portion, the bonding member comprising a tape and having a slit formed therein; and
  a temperature member electrically connected to the bare cell, the temperature member being arranged on the sealing portion and comprising a lead portion on the bonding member,
  wherein the sealing portion comprises:
    a first sealing portion extending from a first side surface of the body portion; and
    a second sealing portion extending from a second side surface of the body portion adjacent the first side surface,
    wherein the second sealing portion is folded with respect to the first sealing portion,
  wherein the bonding member comprises a first bonding member portion at a first side of the slit, and a second bonding member portion at a second side of the slit opposite the first side of the slit, and wherein the second bonding member portion is folded in a different direction than the first bonding member portion,
  wherein the battery case comprises a first sub-case including an accommodating portion and a first edge portion, and a second sub-case including a second edge portion joined to the first edge portion to form the sealing portion, the accommodating portion being extended from the first edge portion in a direction away from the second sub-case, and wherein a portion of the bonding member is arranged on an outer surface of the accommodating portion at a region spaced apart from the sealing portion.

2. The battery pack of claim 1, wherein the slit formed in the bonding member extends in a direction parallel to the first side surface.

3. The battery pack of claim 2, wherein:
the first bonding member portion is arranged on a first outer surface of the second sealing portion; and
the second bonding member portion is arranged on both the first outer surface of the second sealing portion and a second outer surface of the second sealing portion opposite the first outer surface.

4. The battery pack of claim 3, wherein the second bonding member portion includes a portion arranged on the first sealing portion.

5. The battery pack of claim 3, wherein the first bonding member portion includes a portion arranged on a top surface of the body portion that is adjacent each of the first side surface and the second side surface.

6. The battery pack of claim 1, wherein the slit formed in the bonding member extends in a direction perpendicular to the first side surface.

7. The battery pack of claim 6, wherein the first bonding member portion is folded and arranged on both a first outer surface of the second sealing portion and a second outer surface of the second sealing portion opposite the first outer surface.

8. The battery pack of claim 7, wherein the second bonding member portion includes a portion arranged on the first sealing portion.

9. The battery pack of claim 8, wherein the second bonding member portion further includes a portion attached to the first side surface of the body portion.

10. The battery pack of claim 7, wherein an unfolded portion of the second bonding member portion is arranged on a top surface of the body portion that is adjacent each of the first side surface and the second side surface.

11. The battery pack of claim 1, wherein the bare cell further comprises an electrode tab extending from the first sealing portion, the electrode tab being folded with respect to the first sealing portion and being connected on a lead portion of a temperature member of the battery pack.

12. The battery pack of claim 1, wherein the bonding member maintains a surface of the sealing portion opposite a surface of the body portion.

13. The battery pack of claim 1,
wherein the bonding member covers a portion of the sealing portion including a metal layer, and
wherein the bonding member surrounds a corner portion of the sealing portion including an exposed portion of the metal layer.

14. The battery pack of claim 1, wherein the bonding member comprises at least one of polyimide, polypropylene, or polyethylene terephthalate.

15. The battery pack of claim 1, wherein corners of the bonding member have a rounded shape.

16. The battery pack of claim 1,
wherein the bonding member is a first bonding member and bonds the sealing portion to the body portion at a first side of the bare cell, and
wherein the battery pack further comprises a second bonding member bonding the sealing portion to the body portion at a second side of the bare cell opposite the first side.

* * * * *